I. GOLDSTEIN.
ARMOR FOR PNEUMATIC TIRES.
APPLICATION FILED JUNE 24, 1907.
960,308.
Patented June 7, 1910.
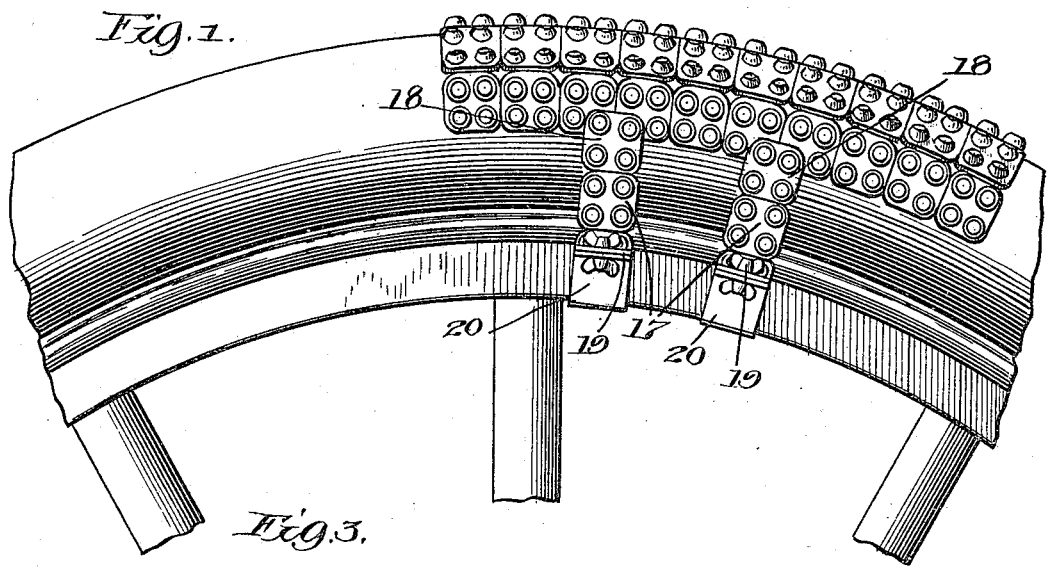
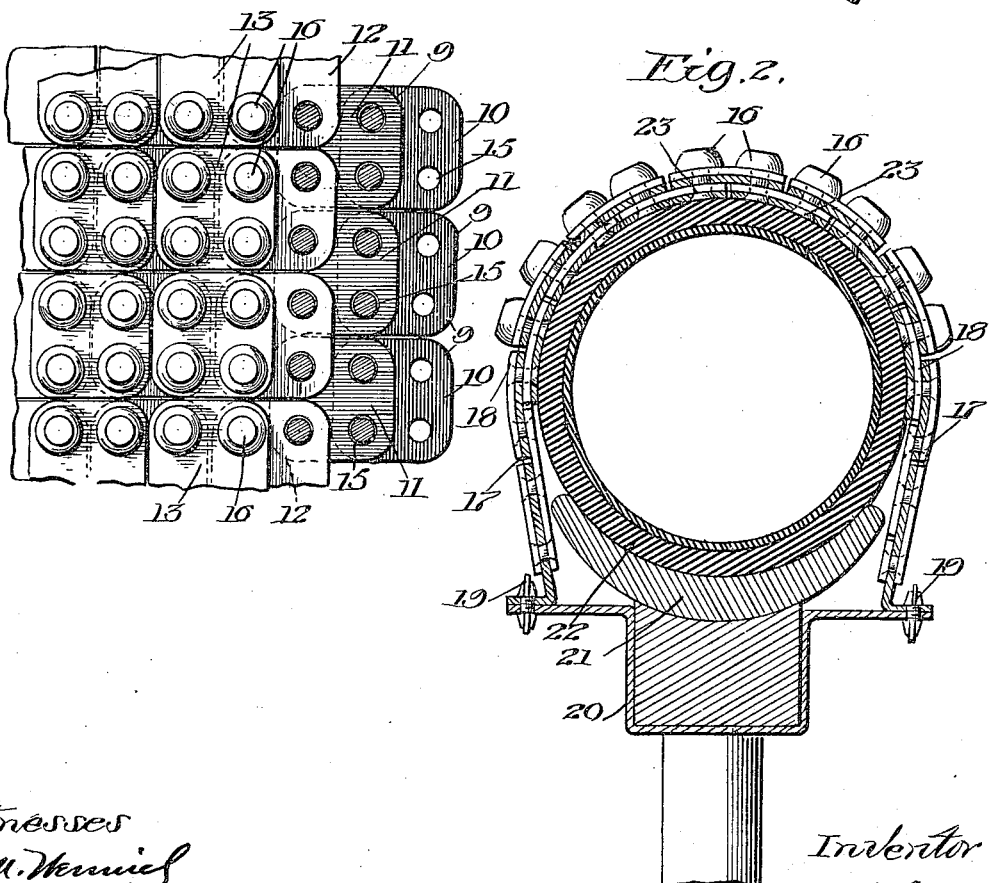
Witnesses
Inventor
Isidore Goldstein

UNITED STATES PATENT OFFICE.

ISIDORE GOLDSTEIN, OF CHICAGO, ILLINOIS.

ARMOR FOR PNEUMATIC TIRES.

960,308.  Specification of Letters Patent.  Patented June 7, 1910.

Application filed June 24, 1907. Serial No. 380,385.

*To all whom it may concern:*

Be it known that I, ISIDORE GOLDSTEIN, a citizen of the United States, residing at Chicago, in the county of Cook and State of Illinois, have invented a new and useful Improvement in Armors for Pneumatic Tires, of which the following is a specification.

This invention relates to mechanism in the nature of a flexible armor for use as the wearing surface or tread of a pneumatic tire for the purpose of preventing punctures of the rubber composing the tire proper.

The object of the invention is to provide perfect protection for the rubber of the tire so as to prevent punctures and wear of the rubber by direct contact with the road, to provide a surface upon the tire of such a character that the tire will not slip or skid on snow, ice or hills, and to provide a tire which grips the pavement securely so that an automobile may start easily.

A further object is to provide a device which will so protect the tire that a rubber tube of uniform thickness may be used and therefore what is known in commerce as a single tube rubber tire may be used in place of the objectionable double tube tire, in connection with the device of this invention.

The invention consists in an arrangement capable of accomplishing all of the foregoing objects, which can be easily and cheaply made, which is flexible and therefore efficient in operation, and is not liable to get out of order.

More specifically, the structure consists in an armor made up of a plurality of relatively small plates placed in layers one over the other and arranged so as to break joints with each other, and be secured together by suitable small bolts or rivets or the like in such a way that the entire armor is flexible, thereby preserving the resiliency of the tire proper while punctures are impossible.

The invention also consists in details of construction which will be hereafter more fully described as the specification proceeds.

Referring to the drawings Figure 1 is a side view of a pneumatic tire having the armor of this invention applied to a part of the tread portion thereof. Fig. 2 is a cross sectional view through the tire showing the application of the armor thereto. Fig. 3 is a plan view of a portion of the armor.

In constructing this armor a plurality of layers of small metallic squares or plates are used, placed over each other in such a way as to break joint with each other, the adjacent layers being loosely secured together by means of screws or rivets penetrating the armor in such a way that the combined armor is flexible without leaving any holes through which foreign objects may pass to penetrate the rubber of the tire proper. Two layers of these pieces or squares of armor plate may be used but in order to secure the most perfect protection four layers should be used; three may be used with better success than two. In constructing the preferred form of this armor the workman places together to form a layer, a number of small plates or squares 10 which, in the particular form illustrated herein are rectangular with round corners 9. Over this layer of plates 10 a second layer of plates 11 is laid, as shown, breaking joint with the first layer in one direction across the armor but not in the other direction. A third layer of plates 12 is then laid over this layer 11 breaking joints with all the plates 11. Finally, another layer of plates 13 is placed over the layer 12 breaking joint with it in one direction across the armor and breaking joint in all directions with the original plates 10. The lines of broken joints between the plates 12 and 13 are in the same direction as the lines of the broken joints between the plates 10 and 11 heretofore described but are offset therefrom as shown in Fig. 3. A fairly satisfactory armor can be made by using plates 10 and 13 alone but the preferred form is much better. At the four corners of each plate 10, 11, 12 and 13, or the corresponding locations upon plates made of different shapes as above suggested, are holes 15 so located that either short rivets or bolts 16 may be passed through the successive layers, there being however a slight clearance between said bolts or rivets and the material of the plates which they join, so that the plates of the armor are adapted to give toward and from each other about said bolts or rivets sufficiently to render the entire armor flexible to a sufficient extent to allow it when, secured upon the tire as shown in Fig. 1, to yield with the tire and therefore perform all of the above described functions. These rivets or bolts 16 may be provided with enlarged protuberant heads, as shown, to prevent skidding or slipping of the tire on a smooth surface.

The armor is fastened to the tire proper by means of a plurality of bands 17 attached at one end 18 to the armor proper and at the other end by screws 19 or other suitable means to a yoke 20 which passes around the felly 21 bearing the tire 22.

The rivets are sunk as shown at 23 so as not to injure the tire. In order to make the armor fit accurately to the tire it is preferable that all of the plates of the armor shall be curved to conform to the surface of the tire which they are to protect; that is to say, they shall be curved in one direction about the center of the tire and in the other direction about the center of the wheel but great accuracy in such curvature is not entirely essential to the success of this invention.

Having thus described the invention what is claimed is:

1. An armor for tires consisting of a plurality of layers each comprising a multitude of relatively small laterally and longitudinally abutting plates breaking joint with each other, said layers being offset relatively to each other and breaking joint with each other.

2. An armor for tires consisting of a plurality of layers each comprising a multitude of relatively small laterally and longitudinally abutting plates, the plates in the different rows breaking joint with each other, combined with means for yieldingly holding said plates adjacent to each other and the layers being offset and breaking joint with each other.

3. An armor for tires composed of a plurality of layers each comprising a multitude of metallic plates, the plates of each layer abutting laterally and longitudinally and the plates of one layer breaking joint with the plates of another layer, said layers being offset and said plates being curved to conform to the surface of the tire.

4. An armor for tires composed of a plurality of layers each comprising a multitude of metallic plates, the plates of each layer abutting laterally and longitudinally and the plates of one layer breaking joint with the plates of another layer, said layers being offset relatively to each other and said plates being curved to conform to the surface of the tire, and rivets through the plates in successive layers loosely holding said plates together.

5. An armor for tires composed of a plurality of layers of regularly shaped plates, the plates of each layer abutting against each other and the plates of successive layers breaking joint with those of the next layer, the plates of the successive layers being so placed that rivets may be passed through the successive layers of plates, each rivet being in a corner of each plate through which it passes and a plurality of rivets so inserted through the plates for the purposes described.

6. An armor for tires consisting of a plurality of layers of approximately square plates the plates of each layer breaking joint with those of the next layer and rivets through the corners of the plates in each layer loosely connecting said plates together for the purposes described.

7. An armor for pneumatic tires consisting of four layers of regularly shaped plates the plates of successive layers being so located that they form an impenetrable surface and rivets joining said layers together each rivet penetrating one plate in each layer.

8. An armor for tires consisting of four layers of plates, each layer being made up of regularly shaped pieces abutting against each other, the first and fourth layers breaking joint with each other in all directions, the second and third layers breaking joint with each other in all directions while the first and second layers break joint with each other in one direction, and the third and fourth layers break joint with each other in one direction and means for joining all of said layers together into a flexible armor for the purpose described.

9. In combination with a tire and its felly, a flexible armor comprising a plurality of layers of laterally and longitudinally abutting plates disposed on the outside of the tire, means for joining said plates and a plurality of yokes fitting over the felly, said yokes being connected with said armor by means of certain of said plates extending from the body of said armor at proper intervals.

10. An armor for tires consisting of a plurality of layers of laterally and longitudinally abutting plates, the plates in each layer being loosely secured to those in the other layers and the layers being offset.

11. An armor for tires comprising a layer of laterally and longitudinally abutting plates and a second layer of similar and similarly arranged plates offset with respect thereto and loosely connected therewith.

12. An armor for tires comprising a plurality of respectively offset layers of laterally and longitudinally abutting plates loosely secured together, the tread layer being provided with protuberances.

13. An armor for tires comprising a plurality of respectively offset layers of laterally and longitudinally abutting plates and rivets for holding said plates loosely together, said rivets having heads projecting beyond the outside layer.

14. An armor for tires comprising a plurality of layers each consisting of a multitude of plates arranged in laterally and longitudinally abutting rows, and means for holding said plates loosely together, the layers being relatively offset.

ISIDORE GOLDSTEIN.

Witnesses:
GEO. S. PINES,
DAVID R. MILLER.